(12) United States Patent
Kim et al.

(10) Patent No.: US 7,088,688 B2
(45) Date of Patent: Aug. 8, 2006

(54) APPARATUS AND METHOD FOR RANDOMLY CONTROLLING TIME SLOT OF SUB-FRAME IN AN NB-TDD CDMA SYSTEM

(75) Inventors: Seong-Hun Kim, Seoul (KR);
Byung-Jae Kwak, Songnam-shi (KR);
Ho-Kyu Choi, Kyonggi-do (KR);
Sung-Ho Choi, Songnam (JP);
Sung-Oh Hwang, Yongin-shi (KR);
Hyun-Woo Lee, Suwon-shi (KR);
Kook-Heui Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 1003 days.

(21) Appl. No.: 10/000,214

(22) Filed: Nov. 2, 2001

(65) Prior Publication Data
US 2002/0150058 A1     Oct. 17, 2002

(30) Foreign Application Priority Data
Nov. 2, 2000     (KR) ............................. 2000-65054

(51) Int. Cl.
*H04J 3/00*     (2006.01)
(52) U.S. Cl. ...................... 370/280; 370/337
(58) Field of Classification Search ............... None
See application file for complete search history.

(56) References Cited

U.S. PATENT DOCUMENTS

| | | | | |
|---|---|---|---|---|
| 6,577,617 B1 * | 6/2003 | Ue et al. | ..................... | 370/347 |
| 6,778,520 B1 * | 8/2004 | Katsura et al. | ............ | 370/342 |
| 2004/0258024 A1 * | 12/2004 | Tiedemann et al. | ......... | 370/332 |
| 2005/0002349 A1 * | 1/2005 | Hayashi et al. | ............. | 370/320 |
| 2005/0018754 A1 * | 1/2005 | Song | ......................... | 375/142 |

* cited by examiner

*Primary Examiner*—Chau Nguyen
*Assistant Examiner*—Rhonda Murphy
(74) *Attorney, Agent, or Firm*—Dilworth & Barrese LLP

(57) ABSTRACT

An apparatus randomly assigns downlink sub-frame time slots for transmitting user data in an NB-TDD CDMA (Code Division Multiple Access) communication system. In the apparatus, a multiplexer creates a user data part by multiplexing user data for UEs (User Equipments), a TFCI (Transport Format Combination Indicator) symbol for the user data, and a TPC (Transmission Power Control command) symbol for controlling transmission power of a downlink channel, and a controller randomly assigns time slots for transmitting the user data part in the sub-frames, based on a time slot number initially assigned for the user data part, a sub-frame number at a transmission point of the user data part, and the number of assigned uplink time slots in the corresponding sub-frame.

24 Claims, 8 Drawing Sheets

US 7,088,688 B2

APPARATUS AND METHOD FOR RANDOMLY CONTROLLING TIME SLOT OF SUB-FRAME IN AN NB-TDD CDMA SYSTEM

PRIORITY

This application claims priority to an application entitled "Apparatus and Method for Randomly Controlling Time Slot of Sub-frame in an NB-TDD CDMA System" filed in the Korean Industrial Property Office on Nov. 2, 2000 and assigned Serial No. 2000-65054, the contents of which are hereby incorporated by reference.

BACKGROUND OF THE INVENTION

1. Field of the Invention

The present invention relates generally to an NB-TDD CDMA (Narrow Band Time Division Duplexing Code Division Multiple Access) communication system, and in particular, to an apparatus and method for randomly assigning time slots of a sub-frame transmitting user data of a user equipment.

2. Description of the Related Art

In an NB-TDD CDMA mobile communication system, a radio network controller (RNC) assigns unique uplink and downlink channels to each user equipment (UE) through a physical channel, for radio communication with the UE. The UE then transmits frames to a Node B through the uplink physical channel assigned thereto, and receives frames transmitted from the Node B through the assigned downlink physical channel. In the NB-TDD CDMA mobile communication system, the physical channels transmit 100 frames per second. That is, each frame has a size (length) of 10 ms. Further, the frame is divided into two sub-frames, and each sub-frame is comprised of 7 time slots Ts(0)–Ts(6).

A structure of the sub-frames used in the NB-TDD CDMA mobile communication system will be described with reference to FIG. 1. In the following description, the 7 time slots Ts of the sub-frame are represented by Ts(0), Ts(1), Ts(2), Ts(3), Ts(4), Ts(5) and Ts(6) from the left hand side on a time axis.

Referring to FIG. 1, a sub-frame used in the NB-TDD CDMA mobile communication system has a length of 5 msec (=6400 chips). The sub-frame is comprised of 7 normal Ts, a downlink pilot time slot (DwPTS), and an uplink pilot time slot (UpPTS). Each Ts has a length of 864 chips, and the DWPTS and a guard period (GP) both have a length 96 chips. The UpPTS has a length of 160 chips. Further, the Ts are classified into uplink time slots and downlink time slots. A common NB-TDD CDMA mobile communication system fixedly designates Ts(0) as a downlink time slot and Ts(1) as an uplink time slot. In addition, a "switching point" indicating a boundary between the uplink time slot and the downlink time slot should occur two times in one sub-frame. The radio network controller determines the number of uplink time slots in the sub-frame for a specific channelization code, and assigns a time slot in response to a request from the UE. Once the UE is assigned the time slot, it continuously uses the assigned time slot until the call is ended. For example, if the UE is initially assigned Ts(5), it will transmit data using only Ts (5).

The term "frame" used in the NB-TDD CDMA mobile communication system refers to two consecutive sub-frames, and it has a length of 10 msec. Further, the term "multi-frame configuration (or structure)" refers to a mapping relationship between a specific Ts in several consecutive frames and a physical channel, a relationship that is repeated at set periods.

The multi-frame configuration will be described in detail. In the multi-frame configuration, a time slot #0 Ts(0) in each sub-frame can be mapped with a broadcast channel (BCH), a forward access channel (FACH) or a paging channel (PCH). A mapping relationship between Ts(0) and the above-stated physical channels of BCH, FACH and PCH can be predefined. The multi-frame configuration, as stated above, refers to a configuration where a frame is repeated in the common channels of BCH, FACH, PCH and PICH (Pilot Channel). However, since only the BCH is considered in the following description, only the configuration where the BCH is repeated will be defined as the multi-frame configuration.

In the NB-TDD CDMA mobile communication system, 200 sub-frames per second are arranged in the physical channel on the time axis at regular intervals, so that a signal transmitted by a specific UE is transmitted at the frequency of exactly 200 times per second. As a result, signals are concentrated on a frequency of 200 Hz belonging to an audible frequency band, causing an electromagnetic interference which may interrupt a voice (or circuit) call of the UE.

SUMMARY OF THE INVENTION

It is, therefore, an object of the present invention to provide an apparatus and method for randomly assigning a time slot in an uplink sub-frame to a UE in an NB-TDD CDMA mobile communication system.

It is another object of the present invention to provide an apparatus and method for randomly assigning a time slot in an uplink sub-frame to a UE while minimizing electromagnetic interference, in an NB-TDD CDMA mobile communication system.

In accordance with one aspect of the present invention, there is provided an apparatus for randomly assigning downlink sub-frame time slots transmitting user data in an NB-TDD CDMA communication system which includes a plurality of frames having different frame numbers, each of the frames including a plurality of sub-frames having different sub-frame numbers, each of the sub-frames including a plurality of time slots. The apparatus assigns user data of a plurality of UEs to the time slots in each sub-frame before transmission. In the apparatus, a multiplexer creates a user data part by multiplexing user data for a UE, a TFCI (Transport Format Combination Indicator) symbol for the user data, and a TPC (Transmission Power Control command) symbol for controlling transmission power of a downlink channel. A controller randomly assigns time slots for transmitting the user data part in the sub-frames, based on a time slot number initially assigned for the user data part, a sub-frame number at a transmission point of the user data part, and the number of assigned uplink time slots in the corresponding sub-frame.

In accordance with another aspect of the present invention, there is provided an apparatus for randomly assigning uplink sub-frame time slots transmitting user data in an NB-TDD CDMA communication system which includes a plurality of frames having different frame numbers, each of the frames including a plurality of sub-frames having different sub-frame numbers, each of the sub-frames including a plurality of time slots. The apparatus assigns user data of a plurality of UEs to the time slots in each sub-frame before transmission. In the apparatus, a multiplexer creates a user data part by multiplexing user data to be transmitted to a Node B, a TFCI symbol for the user data, and a TPC symbol for controlling transmission power of an uplink channel. A controller randomly assigns time slots for transmitting the user data part in the sub-frames, based on a time slot number initially assigned for the user data part, a sub-frame number at a transmission point of the user data part, and the number of assigned uplink time slots in the corresponding sub-frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
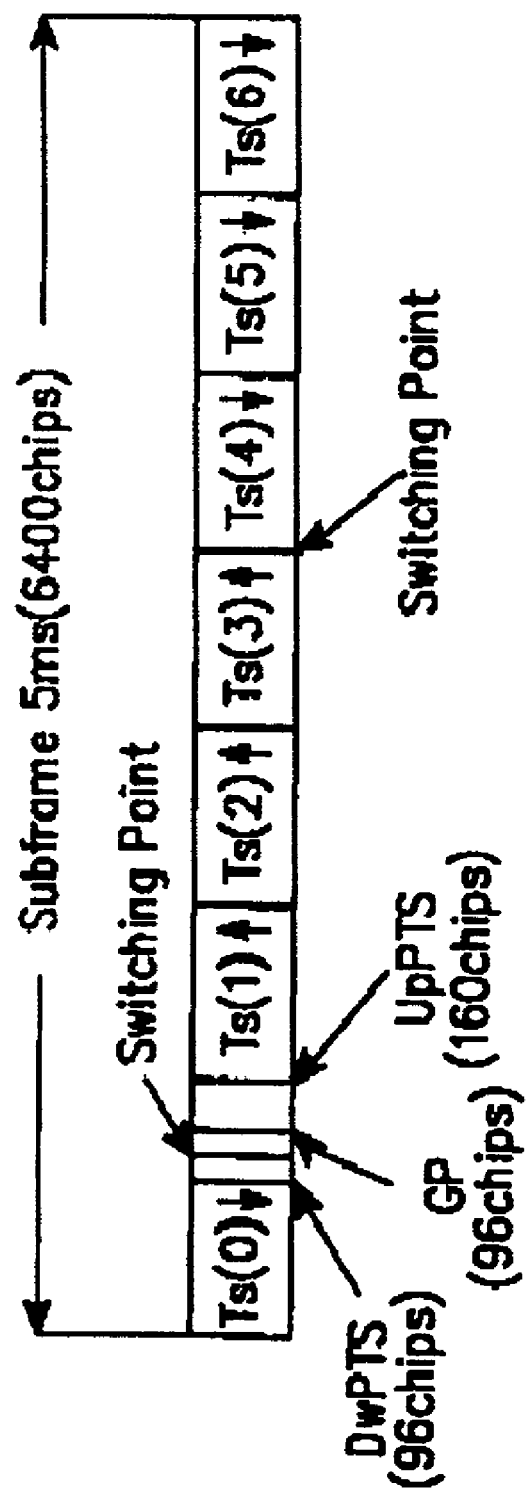
FIG. 1 illustrates a common sub-frame structure in an NB-TDD CDMA mobile communication system.
Figure 2:
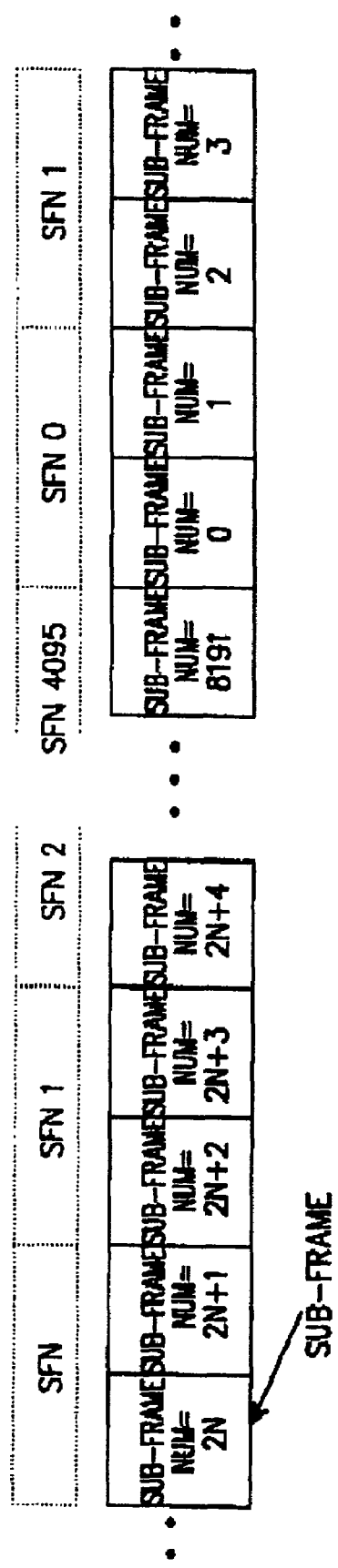
FIG. 2 illustrates a method for allocating sub-frame numbers in an NB-TDD CDMA mobile communication system according to an embodiment of the present invention.

FIG. 2 illustrates a method for allocating sub-frame numbers in an NB-TDD CDMA mobile communication system according to an embodiment of the present invention. Referring to FIG. 2, the NB-TDD CDMA mobile communication system assigns a unique serial number to every sub-frame. Here, the serial number assigned to each sub-frame will be referred to as a "sub-frame number". The sub-frame number is created using a system frame number (SFN) assigned to every frame. The sub-frame number is assigned according to Rule (1) below.

Sub-frame Number=2*$SFN$+$j$ {$j$=0,1}     Rule (1)

In Rule (1), if $j$=0, the sub-frame number indicates a leading sub-frame out of the sub-frames in the same frame; and if $j$=1, the sub-frame number indicates a following sub-frame out of the sub-frames in the same frame.

Since the SFN has a value of 0 to 4095, the sub-frame number increases between 0 and 8191 in a simple manner, and is expressed with a 13-bit binary sequence. Further, it is possible for the UE to check the SFN expressed with a 12-bit binary sequence through a BCH control message.

Before describing an embodiment of the present invention, the terms used in the following description will be defined below.

(1) "Ts(n)" indicates an $n^{th}$ time slot in a given sub-frame in the NB-TDD CDMA mobile communication system. The value 'n', a variable related to the sub-frame, is an integer from 0 to 6 since the sub-frame is comprised of 7 time slots.

(2) "Ts(n,i)" indicates an $n^{th}$ time slot in a sub-frame with a sub-frame number 'i' in the NB-TDD CDMA mobile communication system. The value "i", another variable related to the sub-frame, is an integer between 0 and 8191.

(3) "UL_x" indicates the time slot used by a specific UE x in the NB-TDD CDMA mobile communication system.

(4) "UL_x(i)" indicates a time slot to be used by a specific UE x for the uplink in a sub-frame with a sub-frame number 'i' in the NB-TDD CDMA mobile communication system. UL_x(i) has a value between Ts(1) and Ts(6), and 'i' is has a value of 0 to 8191 in binary.

(5) "ft_x" indicates a time slot number assigned to a UE x for a call. The time slot number is differently assigned to each of the UEs every time slot and has a value between 1 and N. The time slot number also has unique and one to one relationship with the UE it is assigned to.

In the conventional NB-TDD CDMA mobile communication system, if ft_x of a UE x is 'm', the UL_x(i) is continuously fixed to Ts(m) until a call performed by the UE x is ended. However, the embodiment of the present invention changes the UL_x(i) according to the sub-frame number 'i' as represented by Equation (1).

$$UL\_x(i)=Ts[f\_x(i)] \qquad (1)$$

In Equation (1), 'i' indicates a sub-frame number at a given time point of a given system, and f_x(i) indicates an arbitrary function which depends on the ft_x and the 'i'. Although the f_x(i) can be replaced with various functions, the embodiment of the present invention defines the f_x(i) as a function given by Equation (2).

$$f\_x(i)=[\{M[C(i)\ EOR\ S]+ft\_x\}\ mod\ N]+1 \qquad (2)$$

In Equation (2), C(i) indicates a function for outputting a 13-bit binary sequence by receiving a sub-frame number 'i' at a given time point, and C(i) indicates the sub-frame number 'i' expressed in the 13-bit binary sequence. Further, 'S' indicates an integer having a value between 0 and 8191, and is expressed with one of 13-bit binary sequences. 'N' indicates the total number of time slots assigned to the uplink at a given time point of a given system, and EOR indicates an exclusive OR operator operating in a bit unit. M[A] indicates a function taking a binary sequence A={a12, a11, a10, ... a0} as its input value, when an output value of {C(i) EOR S} is a12a11a10 ... a0, and can be represented by Equation (3). Here, it is preferable that the function M[A] should be so determined as to most randomly generate its output value.

$$M[A] = \sum_{n=0}^{12} a_n \times g_n \quad (3)$$

In addition, when applied to the above-defined f_x(i) function, C(i) is defined as 'i' and g(n) is defined as '1', and the result becomes equal to the number of 1s in the 13-bit binary sequence A. As a result, the function M[A] becomes a function of outputting a value determined by counting the number of 1s in the 13-bit binary sequence.

Therefore, in a first embodiment for randomly assigning an uplink time slots to a UE, the M[A] is represented by Equation (4), and a method for randomly assigning a time slot of a sub-frame will be described with reference to Equation (4).

$$M[A] = \sum_{n=0}^{12} a_n \quad (4)$$

An operation according to the first embodiment of the present invention, being dependent on the N value, will be described with reference to FIGS. 4 to 6.

Figure 3:
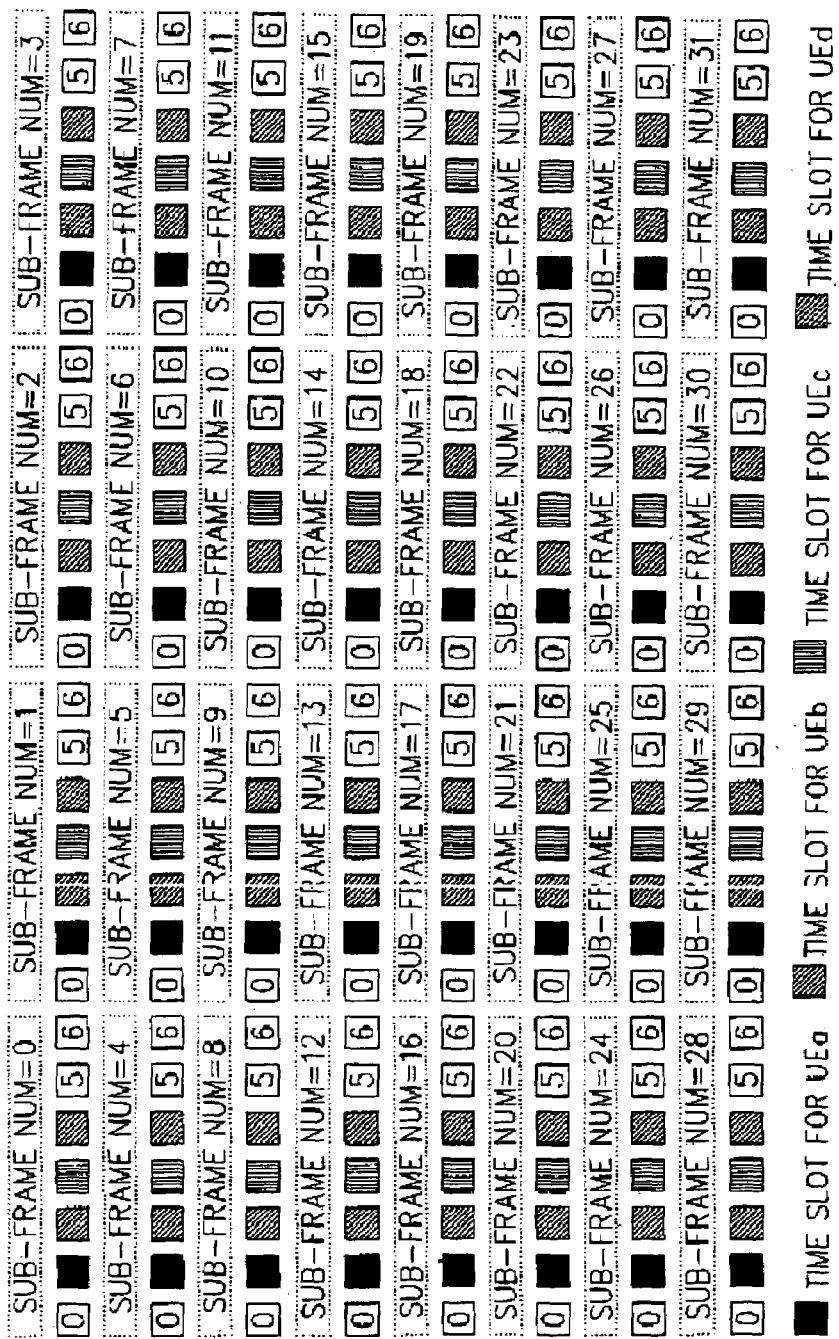
FIG. 3 illustrates an example of sub-frames transmitted by UEs in the common NB-TDD CDMA mobile communication system.

Before describing the operation according to the first embodiment of the present invention, an example of sub-frames transmitted by the UEs in the convention NB-TDD CDMA mobile communication system will be described with reference to FIG. 3. FIG. 3 illustrates an example of sub-frames transmitted by the UEs in the common NB-TDD CDMA mobile communication system, and particularly illustrates an exemplary method of transmitting sub-frames for the case of N=4. Since N=4, 4 time slots per sub-frame are designated as uplink time slots, and then used by the UEs of UEa, UEb, and UEc. Each of the UEs uses the initially assigned time slot until its call is ended.

Now, a time slot configuration of the sub-frame according to the first embodiment of the present invention will be described with reference to FIGS. 4 to 6.

First, the description will be made with reference to FIG. 4.

Figure 4:
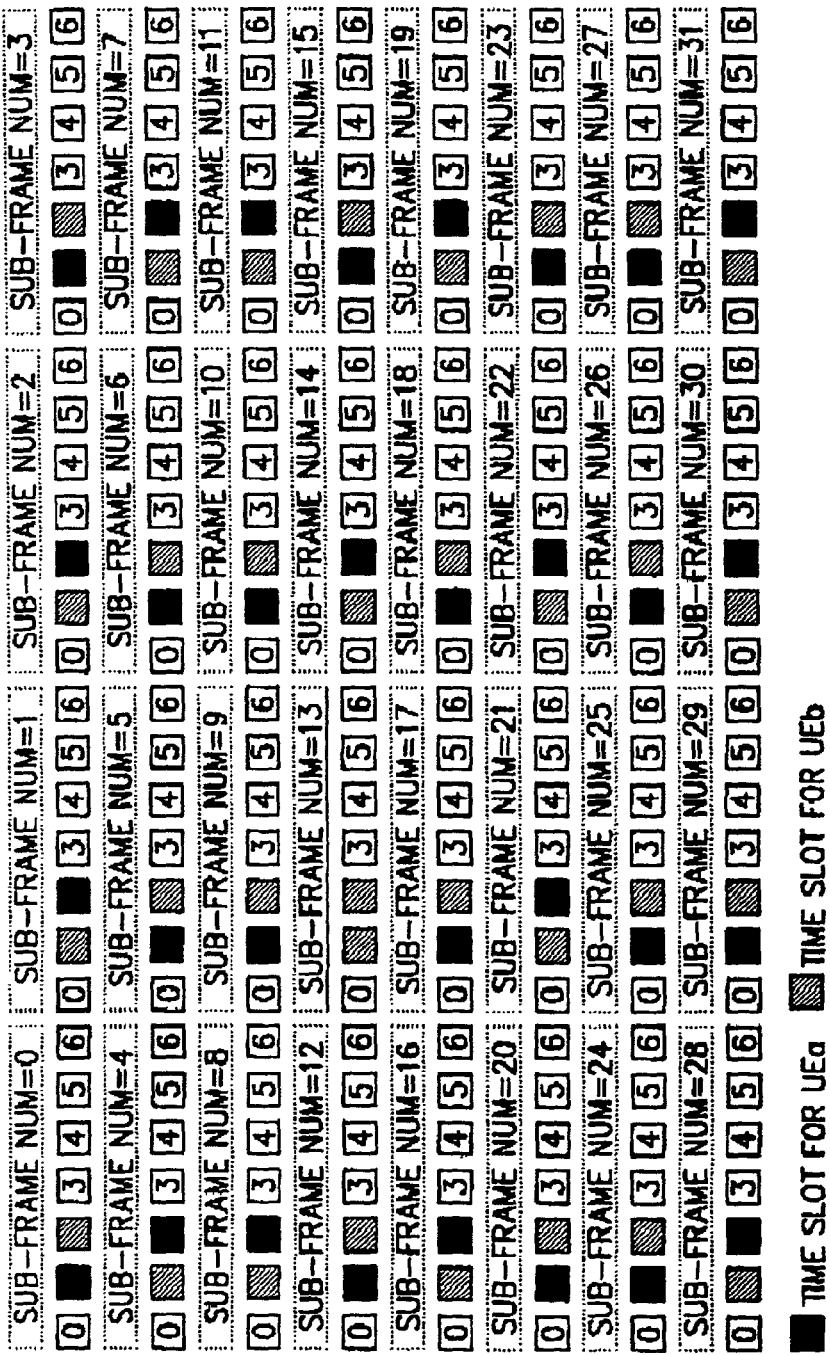
FIG. 4 illustrates an example of a sub-frame time slot configuration in the NB-TDD CDMA mobile communication system according to a first embodiment of the present invention.

FIG. 4 illustrates an example of a sub-frame time slot configuration in an NB-TDD CDMA mobile communication system according to a first embodiment of the present invention, and particularly illustrates a sub-frame time slot configuration for the case of N=2. In the case of N=2, if UEa and UEb use uplink time slots, then f_a(i) and f_b(i) for the sub-frame numbers of 0 to 31 are represented by Table 1, given that a 13-bit binary sequence "010110111010" is selected as the S, ft_a=1 and ft_b=2. The sub-frame time slot configuration made based on Table 1 is illustrated in FIG. 4.

TABLE 1

| Sub-frame Num | f_a(i) | f_b(i) |
|---|---|---|
| 0 | 1 | 2 |
| 1 | 2 | 1 |
| 2 | 2 | 1 |
| 3 | 1 | 2 |
| 4 | 2 | 1 |
| 5 | 1 | 2 |
| 6 | 1 | 2 |
| 7 | 2 | 1 |
| 8 | 2 | 1 |
| 9 | 1 | 2 |

TABLE 1-continued

| Sub-frame Num | f_a(i) | f_b(i) |
|---|---|---|
| 10 | 1 | 2 |
| 11 | 2 | 1 |
| 12 | 1 | 2 |
| 13 | 2 | 1 |
| 14 | 2 | 1 |
| 15 | 1 | 2 |
| 16 | 2 | 1 |
| 17 | 1 | 2 |
| 18 | 1 | 2 |
| 19 | 2 | 1 |
| 20 | 1 | 2 |
| 21 | 2 | 1 |
| 22 | 2 | 1 |
| 23 | 1 | 2 |
| 24 | 1 | 2 |
| 25 | 1 | 2 |
| 26 | 1 | 2 |
| 27 | 1 | 2 |
| 28 | 2 | 1 |
| 29 | 1 | 2 |
| 30 | 1 | 2 |
| 31 | 2 | 1 |

In addition, if N=1 and UEa uses the uplink time slot, the result of 'mod 1' operation in Equation (2) is always '0'. Thus, f_a(i)=1 and the sub-frame is transmitted in the same method as in the conventional NB-TDD CDMA mobile communication system.

Second, the description will be made with reference to FIG. 5.

Figure 5:
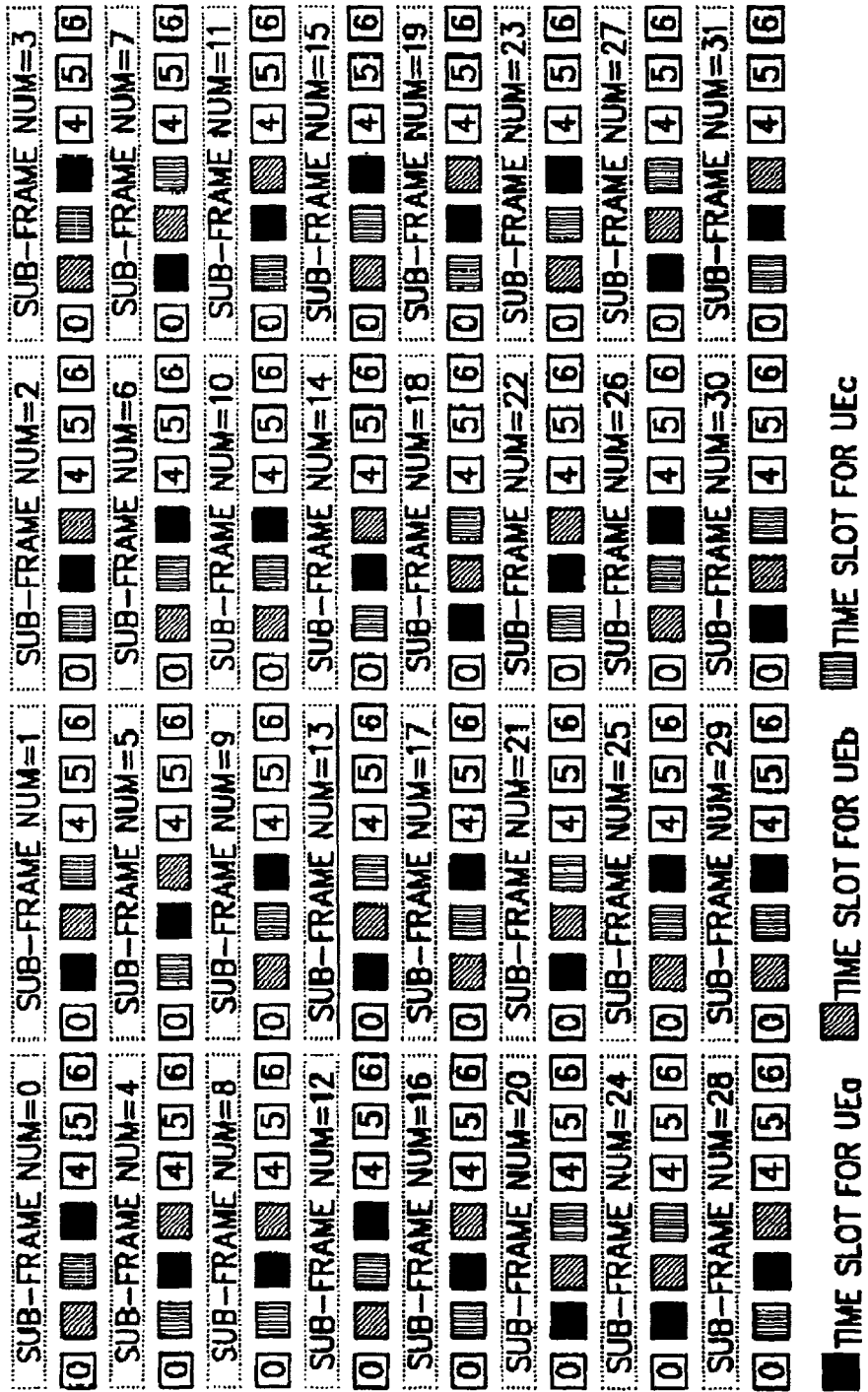
FIG. 5 illustrates another example of a sub-frame time slot configuration in the NB-TDD CDMA mobile communication system according to the first embodiment of the present invention.

FIG. 5 illustrates another example of a sub-frame time slot configuration in the NB-TDD CDMA mobile communication system according to the first embodiment of the present invention, and more particularly illustrates a sub-frame time slot configuration for the case of N=3. In the case of N=3, if UEa, UEb, and UEc use uplink time slots, then f_a(i), f_b(i) and f_c(i) for the sub-frame numbers of 0 to 31 are represented by Table 2, given that a 13-bit binary sequence "0101110111010" is equally selected as the S, ft_a=1, ft_b=2 and ft_c=3. The sub-frame time slot configuration on Table 2 is illustrated in FIG. 5.

TABLE 2

| Sub-frame Num | f_a(i) | f_b(i) | f_c(i) |
|---|---|---|---|
| 0 | 3 | 1 | 2 |
| 1 | 1 | 2 | 3 |
| 2 | 2 | 3 | 1 |
| 3 | 3 | 1 | 2 |
| 4 | 2 | 3 | 1 |
| 5 | 2 | 3 | 1 |
| 6 | 3 | 1 | 2 |
| 7 | 1 | 2 | 3 |
| 8 | 2 | 3 | 1 |
| 9 | 3 | 1 | 2 |
| 10 | 3 | 1 | 2 |
| 11 | 2 | 3 | 1 |
| 12 | 3 | 1 | 2 |
| 13 | 1 | 2 | 3 |
| 14 | 2 | 3 | 1 |
| 15 | 3 | 1 | 2 |
| 16 | 2 | 3 | 1 |
| 17 | 3 | 1 | 2 |
| 18 | 1 | 2 | 3 |
| 19 | 2 | 3 | 1 |
| 20 | 1 | 2 | 3 |
| 21 | 1 | 2 | 3 |
| 22 | 2 | 3 | 1 |
| 23 | 3 | 1 | 2 |
| 24 | 1 | 2 | 3 |

TABLE 2-continued

| Sub-frame Num | f_a(i) | f_b(i) | f_c(i) |
|---|---|---|---|
| 25 | 3 | 1 | 2 |
| 26 | 3 | 1 | 2 |
| 27 | 1 | 2 | 3 |
| 28 | 2 | 3 | 1 |
| 29 | 3 | 1 | 2 |
| 30 | 1 | 2 | 3 |
| 31 | 2 | 3 | 1 |

Third, the description will be made with reference to FIG. 6.

Figure 6:
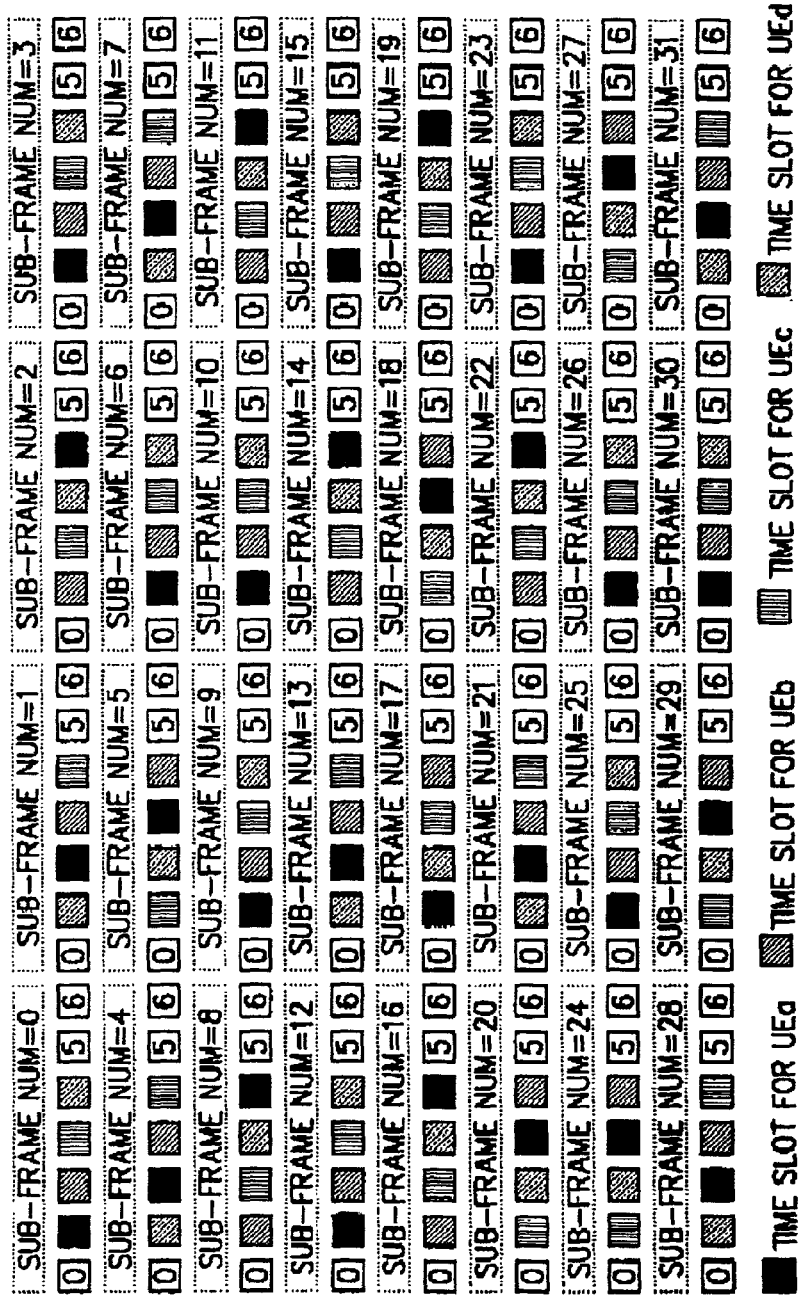
FIG. 6 illustrates another example of a sub-frame time slot configuration in the NB-TDD CDMA mobile communication system according to the first embodiment of the present invention.

FIG. 6 illustrates further another example of a sub-frame time slot configuration in the NB-TDD CDMA mobile communication system according to the first embodiment of the present invention, especially illustrates a sub-frame time slot configuration for the case of N=4. In the case of N=4, if UEa, UEb, UEc and UEd use uplink slots, then f_a(i), f_b(i), f_c(i) and f_d(i) for the sub-frame numbers of 0 to 31 are represented by Table 3, given that a 13-bit binary sequence "0101110111010" is equally selected as the S, ft_a=1, ft_b=2, ft_c=3 and ft_d=4. The sub-frame time slot configuration made based on Table 3 is illustrated in FIG. 6.

TABLE 3

| Sub-frame Num | f_a(i) | f_b(i) | f_c(i) | f_d(i) |
|---|---|---|---|---|
| 0 | 1 | 2 | 3 | 4 |
| 1 | 2 | 3 | 4 | 1 |
| 2 | 4 | 1 | 2 | 3 |
| 3 | 1 | 2 | 3 | 4 |
| 4 | 2 | 3 | 4 | 1 |
| 5 | 3 | 4 | 1 | 2 |
| 6 | 1 | 2 | 3 | 4 |
| 7 | 2 | 3 | 4 | 1 |
| 8 | 4 | 1 | 2 | 3 |
| 9 | 1 | 2 | 3 | 4 |
| 10 | 1 | 2 | 3 | 4 |
| 11 | 4 | 1 | 2 | 3 |
| 12 | 1 | 2 | 3 | 4 |
| 13 | 2 | 3 | 4 | 1 |
| 14 | 4 | 1 | 2 | 3 |
| 15 | 1 | 2 | 3 | 4 |
| 16 | 4 | 1 | 2 | 3 |
| 17 | 1 | 2 | 3 | 4 |
| 18 | 3 | 3 | 4 | 1 |
| 19 | 4 | 1 | 2 | 3 |
| 20 | 3 | 4 | 1 | 2 |
| 21 | 2 | 3 | 4 | 1 |
| 22 | 4 | 1 | 2 | 3 |
| 23 | 1 | 2 | 3 | 4 |
| 24 | 3 | 4 | 1 | 2 |
| 25 | 1 | 2 | 3 | 4 |
| 26 | 1 | 2 | 3 | 4 |
| 27 | 3 | 4 | 1 | 2 |
| 28 | 4 | 1 | 2 | 3 |
| 29 | 1 | 2 | 3 | 4 |
| 30 | 3 | 4 | 1 | 2 |
| 31 | 4 | 1 | 2 | 3 |

Further, even in the case of N=5 and N=6, the sub-frame time slot configuration can be applied in the same manner as in the case of N=4.

The assignment configuration of the sub-frame time slots according to the first embodiment where the M[A] is applied as defined by Equation (4), has been described with reference to FIGS. 4 to 6. Next, a sub-frame time slot configuration according to a second embodiment of the present invention will be described.

In the second embodiment of the present invention, the M[A] will be defined in the different form from that of the first embodiment of the present invention. That is, when applied to the function f_x(i), C(i) is defined as 'i', and g(n) is defined as $2^n$. As a result, the M[A] according to the second embodiment of the present invention is represented by Equation (5), and a method for randomly assigning a time slot of a sub-frame according to the second embodiment will be described with reference to Equation (5).

$$M[A] = \sum_{n=0}^{12} a_n \times 2^n \quad (5)$$

In equation (5), the function M[A] becomes a function of outputting a decimal number obtained by converting a 13-bit binary sequence.

An operation according to the second embodiment of the present invention, being dependent on the N value, will be described.

In the case of N=2, if UEa and UEb are assigned Ts(1) and Ts(2) as their uplink time slots, respectively, then f_a(i) and f_b(i) for the sub-frame numbers of 0 to 31 are represented by Table 4, given that "1101100101101" out of 13-bit binary sequences is selected as the S.

TABLE 4

| Sub-frame Num | f_a(i) | f_b(i) |
|---|---|---|
| 0 | 1 | 2 |
| 1 | 2 | 1 |
| 2 | 1 | 2 |
| 3 | 2 | 1 |
| 4 | 1 | 2 |
| 5 | 2 | 1 |
| 6 | 1 | 2 |
| 7 | 2 | 1 |
| 8 | 1 | 2 |
| 9 | 2 | 1 |
| 10 | 1 | 2 |
| 11 | 2 | 1 |
| 12 | 1 | 2 |
| 13 | 2 | 1 |
| 14 | 1 | 2 |
| 15 | 2 | 1 |
| 16 | 1 | 2 |
| 17 | 2 | 1 |
| 18 | 1 | 2 |
| 19 | 2 | 1 |
| 20 | 1 | 2 |
| 21 | 2 | 1 |
| 22 | 1 | 2 |
| 23 | 2 | 1 |
| 24 | 1 | 2 |
| 25 | 2 | 1 |
| 26 | 1 | 2 |
| 27 | 2 | 1 |
| 28 | 1 | 2 |
| 29 | 2 | 1 |
| 30 | 1 | 2 |
| 31 | 2 | 1 |

Even in the case of N=1, 3, 4, 5 and 6, the f_x(i) is calculated and applied in the same manner as in the case of N=2.

The assignment configuration of the sub-frame time slots according to the second embodiment where the M[A] is applied as defined by Equation (5), has been described. Next, a sub-frame time slot configuration according to a third embodiment of the present invention will be described.

In the third embodiment of the present invention, the M[A] will be defined in the different form from that of the first and second embodiments of the present invention. That is, when applied to the function f_x(i), C(i) is defined as 'i', and g(n) is defined as (n+1). As a result, the M[A] is represented by Equation (6), and a method for randomly assigning a time slot of a sub-frame according to the third embodiment will be described with reference to Equation (6).

$$M[A] = \sum_{n=0}^{12} a_n \times (n+1) \qquad (6)$$

In the case of N=2, if UEa and UEb are assigned Ts(1) and Ts(2) as their uplink time slots, respectively, as in the second embodiment of the present invention, then f_a(i) and f_b(i) for the sub-frame numbers of 0 to 31 are represented by Table 5, given that "1101100101101" out of 13-bit binary sequences is selected as the S.

TABLE 5

| Sub-frame Num | f_a(i) | f_b(i) |
|---|---|---|
| 0 | 1 | 2 |
| 1 | 2 | 1 |
| 2 | 2 | 1 |
| 3 | 1 | 2 |
| 4 | 2 | 1 |
| 5 | 1 | 2 |
| 6 | 1 | 2 |
| 7 | 2 | 1 |
| 8 | 2 | 1 |
| 9 | 1 | 2 |
| 10 | 1 | 2 |
| 11 | 2 | 1 |
| 12 | 1 | 2 |
| 13 | 2 | 1 |
| 14 | 2 | 1 |
| 15 | 1 | 2 |
| 16 | 2 | 1 |
| 17 | 1 | 2 |
| 18 | 1 | 2 |
| 19 | 2 | 1 |
| 20 | 1 | 2 |
| 21 | 2 | 1 |
| 22 | 2 | 1 |
| 23 | 1 | 2 |
| 24 | 1 | 2 |
| 25 | 2 | 1 |
| 26 | 2 | 1 |
| 27 | 1 | 2 |
| 28 | 2 | 1 |
| 29 | 1 | 2 |
| 30 | 1 | 2 |
| 31 | 2 | 1 |

The assignment configuration of the sub-frame time slots according to the third embodiment where the M[A] is applied as defined by Equation (6), has been described. Next, a sub-frame time slot configuration according to a fourth embodiment of the present invention will be described.

In the fourth embodiment of the present invention, the M[A] will be defined in the different form from that of the first, second and third embodiments of the present invention. That is when applied to the function f_x(i), C(i) is defined as '(i+2$^i$) mod 8192', and g(n) is defined as 2$^n$. As a result, the M[A] is represented by Equation (7), and a method for randomly assigning a time slot of a sub-frame according to the fourth embodiment will be described with reference to Equation (7).

$$M[A] = \sum_{n=0}^{12} a_n \times 2^n \qquad (7)$$

In the case of N=3, if UEa, UEb and UEc use time slots, then f_a(i), f_b(i) and f_c(i) for the sub-frame numbers of 0 to 31 are represented by Table 6, given that "1101100101101" out of 13-bit binary sequences is selected as the S.

TABLE 6

| Sub-frame Num | f_a(i) | f_b(i) | f_c(i) |
|---|---|---|---|
| 0 | 1 | 2 | 3 |
| 1 | 2 | 3 | 1 |
| 2 | 3 | 1 | 2 |
| 3 | 1 | 2 | 3 |
| 4 | 2 | 3 | 1 |
| 5 | 1 | 2 | 3 |
| 6 | 1 | 2 | 3 |
| 7 | 2 | 3 | 1 |
| 8 | 2 | 3 | 1 |
| 9 | 3 | 1 | 2 |
| 10 | 3 | 1 | 2 |
| 11 | 2 | 3 | 1 |
| 12 | 1 | 2 | 3 |
| 13 | 1 | 2 | 3 |
| 14 | 3 | 1 | 2 |
| 15 | 2 | 3 | 1 |
| 16 | 1 | 2 | 3 |
| 17 | 2 | 3 | 1 |
| 18 | 3 | 1 | 2 |
| 19 | 2 | 3 | 1 |
| 20 | 1 | 2 | 3 |
| 21 | 3 | 1 | 2 |
| 22 | 1 | 2 | 1 |
| 23 | 3 | 1 | 3 |
| 24 | 2 | 3 | 1 |
| 25 | 2 | 3 | 1 |
| 26 | 2 | 3 | 1 |
| 27 | 1 | 2 | 3 |
| 28 | 2 | 3 | 1 |
| 29 | 2 | 3 | 1 |
| 30 | 3 | 1 | 2 |
| 31 | 2 | 3 | 1 |

Further, even in the case of N=1, 2, 4, 5 and 6, the sub-frame time slot configuration can be applied in the same manner as in the case of N=3.

A description will now be made of a communication procedure between the UE, which randomly controls transmission points of the uplink time slots in the sub-frame, and a UTRAN (UMTS (Universal Mobile Telecommunication System) Terrestial Radio Access Network). Of course, the function f_x(i, S, N, ft_x) used to randomly assign the sub-frame time slots should be predefined between physical layers of a UE and a Node B.

First, a description will be made of an operating process of the UE.

1. Operating Process of UE (1) Cell search is performed.

(2) A radio resource control (RRC) layer of a UE which has acquired synchronization with a cell to which the UE belongs and also acquired BCH access information through the cell search, receives the following information over the BCH.

Number 'N' of uplink time slots per sub-frame

EMI (Electromagnetic Indicator) indicator

'S' used to randomly assign time slots

However, the value S is not transmitted when the corresponding cell does not support the method for randomly assigning the sub-frame time slot or the UE and the UTRAN previously recognize the S value.

(3) The RRC layer of the UE transmits an upper layer message requesting assignment of a dedicated channel (DCH). Herein, an RB SETUP (Radio Barer SETUP) message will be used for the upper layer message. A detailed description of a transmission format of the upper layer message and a primitive of the message will be omitted.

(4) The RRC layer of the UE receives the RB SETUP message, and then detects ft_x using information on Uplink Timeslots and Codes from Informaion Element(IE) of the RB SETUP message.

(5) If the received EMI indicator indicates use of a random time slot determination method, the RRC layer of the UE transmits S, N and ft_x to a controller of the physical layer, and then informs the controller that the random time slot determination method will be applied. For the communication between the RRC layer of the UE and the physical layer, CPHY-RL-Setup-REQ can be used as a primitive. It can be used for inter-layers communication as a message. That is, in order to randomly determine the time slot of the UE, the RRC layer of the UE can receive information on the initial uplink time slot from the Node B and then provide the received information to the controller which controls the time slots of the physical layer. In addition, the UE can either receive the EMI indicator through an NBAP (Node B Application Part) message from a radio network controller (RNC), or receive information on the EMI indicator along with the information on the initial uplink time slot during cell setup.

(6) Upon receipt of the initial uplink time slot from the Node B, the physical layer controller of the UE calculates f_x(i, S, N, ft_x) using the receive information, and randomly determines the time slot assigned to the UE using the calculated value, before transmission.

2. Operating Process of UTRAN (1) An RRC layer of the radio network controller provides information on the number N of the time slots to be used for the uplink to a Node B of the corresponding cell, using a timeslot configuration Information Element(IE) of a Cell Setup Request message. The Node B transmits the provided N to a controller of the physical layer through an NBAP message. In this case, if the S value has not been previously determined, the Node B can transmit the S value along with the N value.

(2) The RRC layer of the radio network controller periodically transmits the information described in the process (2) of the UE operating process along the BCH in the same manner as in the conventional NB-TDD CDMA system. Alternatively, the Node B can provide information on the EMI indicator while providing the initial uplink time slot to be used by the UE.

(3) The RRC layer of the radio network controller receives an RAB (Radio Access Bearer) Assignment Request message or an RAB Modification Request message from a core network (CN). If it is necessary to assign a dedicated channel (DCH), the RRC layer of the radio network controller transmits the RB Setup message to the RRC layer of the UE.

(4) Upon receiving the RB Setup message, the RRC layer of the UE transmits an RB Setup Complete message to the radio network controller in response to the RB Setup message. Upon receiving the RB Setup Complete message, the radio network controller transmits a Radio Link Setup message to a Node B in the corresponding cell. The Node B then determines ft_x using the timeslot configuration IE of the uplink dedicated physical channel (UL-DPCH) information of the NBAP message, and provides the determined value to the controller of the physical layer.

(5) The physical layer of the Node B recognizes a time slot to be used by a specific UE by calculating f_x(i, S, N, ft_x) for the UE. In this manner, the Node B recognizes the sub-frame time slot randomly transmitted by the UE, and prepares to receive user data transmitted by the UE.

Next, a transceiver structure of the UE and the Node B for randomizing the uplink time slot, i.e., randomly changing the uplink time slot of each UE in the sub-frame thereby to solve the electromagnetic interference problem, will be described with reference to FIGS. 7 and 8.

Figure 7:
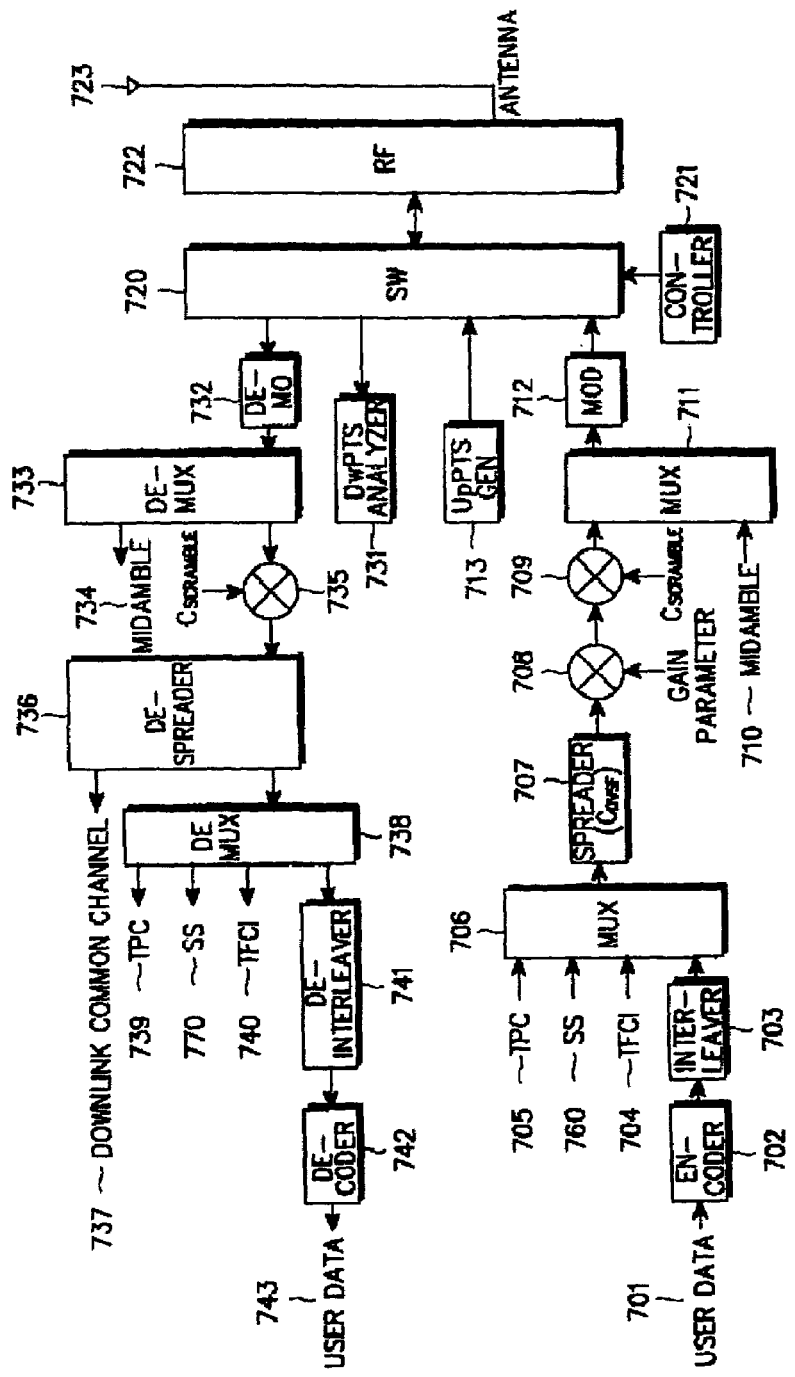
FIG. 7 illustrates a structure of a UE transceiver for performing an operation according to an embodiment of the present invention.
Figure 8:
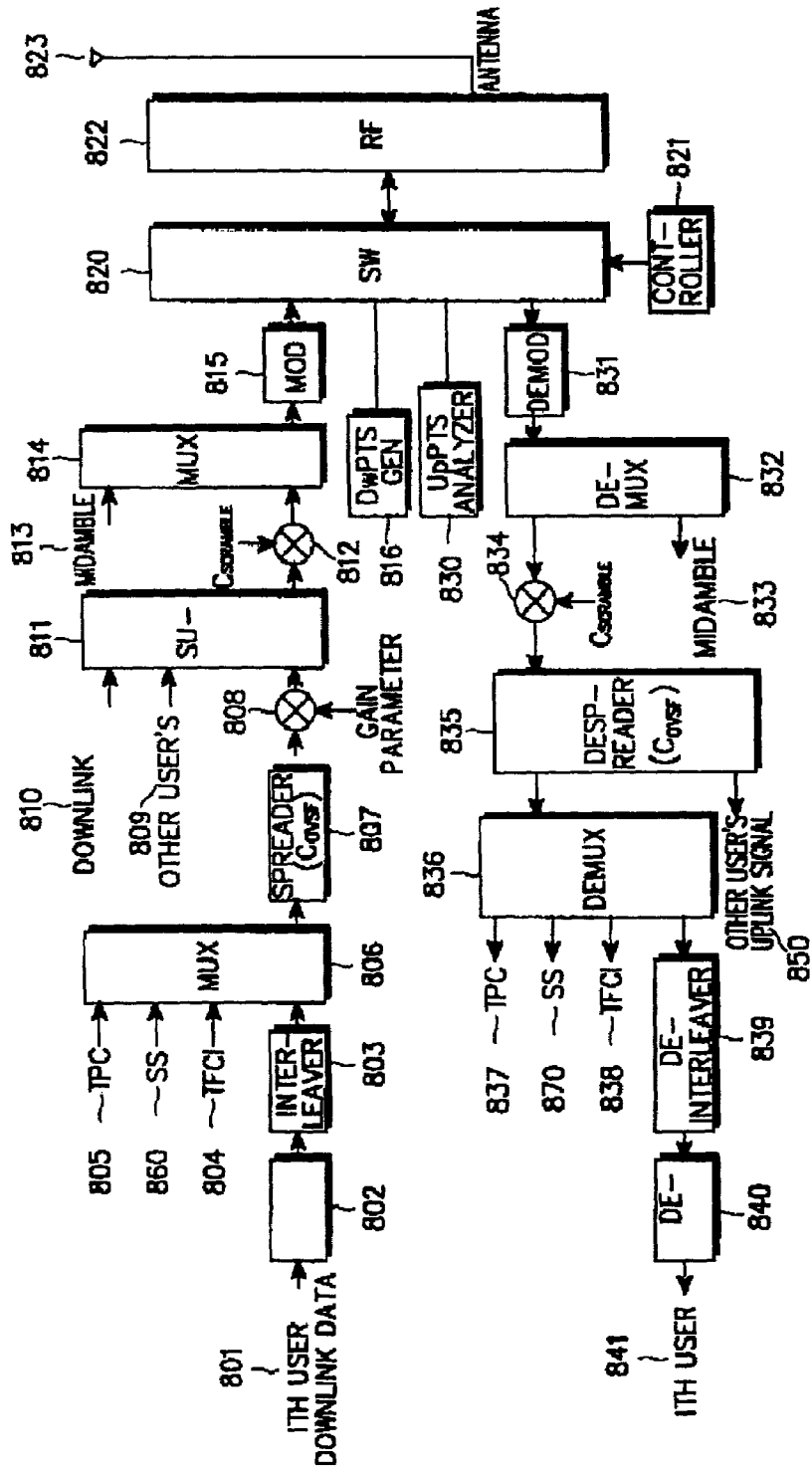
FIG. 8 illustrates a structure of a Node B transceiver for performing an operation according to an embodiment of the present invention.

FIG. 7 illustrates a structure of a UE transceiver for performing an operation according to an embodiment of the present invention, and FIG. 8 illustrates a structure of a Node B transceiver for performing an operation according to an embodiment of the present invention. For the sake of convenience, it is assumed in FIGS. 7 and 8 that communication is performed between a Node B and an $i^{th}$ UE in the Node B. However, communication between a Node B and another UE in the Node B can also be performed in the same manner.

First, a structure of the UE transceiver will be described with reference to FIG. 7.

In general, since the NB-TDD CDMA mobile communication system uses the same frequency band for both uplink transmission and downlink transmission, a transmitter is separated from a receiver by a switch. First, a structure of the transmitter in the UE transceiver of FIG. 7 will be described.

$i^{th}$ user's data 701 to be transmitted to the Node B through the UE is provided to an encoder 702. The encoder 702 channel-codes the received user data 701 with a convolutional code or a channelization code, and provides the channel-coded user data to an interleaver 703. The interleaver 703 interleaves the $i^{th}$ user's data channel-coded by the encoder 702 according to a predefined rule, and provides the interleaved user data to a multiplexer (MUX) 706. Here, the interleaver 703 rearranges (or interleaves) the $i^{th}$ channel-coded user data according to the predefined rule, so that possible narrow band interference is dispersed after deinterleaving, thus minimizing the effects of the narrow band interference.

The multiplexer 706 receives an output signal of the interleaver 703, a transmit power control command (hereinafter, referred to as "TPC") 705, a transmit format combination indicator (TFCI) 704 and SS 760, and then multiplexes the output signal of the interleaver 703 and the received TPC 705, TFCI 704 and Synchronization Shift(SS) 760 into a slot format for the NB-TDD CDMA communication system. Here, the TPC 705 is a command for controlling transmission power of the downlink transmitted from the Node B to the UE, and the TFCI 704 is a codeword indicating a transmit format combination indicator of various data included in the $i^{th}$ user's data transmitted from the UE. Further, the SS 760 is a command used to control synchronization of a downlink signal. In addition, the signal obtained by multiplexing of the TFCI 704, TPC 705 and SS 760, output from the multiplexer 706, and the output signal of the interleaver 703, will be referred to as a "user data part". The $i^{th}$ user's data part output from the multiplexer 706 is provided to the spreader 707. The spreader 707 spreads the $i^{th}$ user's data part by multiplying it by a channelization code $C_{OVSF}$, and provides its output to a multiplier 708. For example, an OVSF (Orthogonal Variable Spreading Factor) code is used for the channelization code used in the spreader 707, and the OVSF code is an orthogonal code, a length of which is determined depending on a data rate of the data. The channelization code serves to identify an uplink channel of each UE, when a plurality of UEs simultaneously transmit the data in one time slot in the NB-TDD CDMA mobile communication system. Further, according to its length, the channelization code serves to spread a band where the user data from the UE is transmitted.

The $i^{th}$ user's data part, channel-spread with the OVSF code, is multiplied by a channel gain parameter by the multiplier 708, and then provided to a multiplier 709. Here, the channel gain parameter serves to determine transmission power of an uplink channel for the $i^{th}$ user's data, and is determined based on the type of data transmitted through the $i^{th}$ user's data part and the TPC transmitted from the Node B. The multiplier 709 multiplies the $i^{th}$ user's data part output from the multiplier 708 by a scrambling code $C_{SCRAMBLE}$, and provides the scrambled data to a multiplexer 711. Here, the scrambling code $C_{SCRAMBLE}$, a code used in the $3^{rd}$ generation asynchronous mobile communication standard, is used to identify Node B, identify UE and decrease a multipath cross correlation of the same signal. In the NB-TDD CDMA mobile communication system, the scrambling code is used only to identify the Node B and decrease the cross correlation. In the NB-TDD CDMA mobile communication system, each Node B uses one scrambling code, and the scrambling code is used for both the uplink transmission and the downlink transmission. That is, the multiplier 709 serves as a scrambler.

The multiplexer 711 multiplexes the output signal of the multiplier 709 and a midamble 710, and provides the multiplexed signal to a modulator 712. The output signal of the multiplexer 711 becomes an $i^{th}$ user's uplink channel signal, and a basic transmission unit of the $i^{th}$ user's uplink channel becomes a time slot. The $i^{th}$ user's uplink channel is comprised of the user data 701, the TPC 705, the TFCI 704, the midamble 710 and the guard period (GP). The midamble 710 is used for multi-user detection supported in the NB-TDD CDMA mobile communication system and for channel estimation. The guard period is created to prevent generation of an interference noise between the uplink transmission and the downlink transmission due to an overlap of the uplink time slot and the downlink time slot in the NB-TDD CDMA mobile communication system. Actually, no signal is transmitted in the guard period.

The modulator 712 modulates the output signal of the multiplexer 711, i.e., the $i^{th}$ user's uplink channel output, using QPSK (Quadrature Phase Shift Keying), 8PSK (8-ary Phase Shift Keying), or QAM (Quadrature Amplitude Modulation), and provides the modulated signal to a switch 720. The switch 720 is switched on at a slot where the $i^{th}$ user's uplink channel is to be transmitted, thereby to transmit the $i^{th}$ user's uplink channel to the Node B. Further, the switch 720 is controlled by a controller 721, and the controller 721 controls an uplink channel transmission point, i.e., a sub-frame time slot to be transmitted, according to the first to fourth embodiment of the present invention, and also controls a transmission point of UpPTS and a reception point of DwPTS according to the sub-frame structure of the NB-TDD CDMA mobile communication system, i.e., controls a reception point of a downlink channel transmitted from the Node B to the UE. In addition, the controller 721 calculates the uplink channel transmission point, using f_x (i,S,N,ft_x) recognized by the controller 721 and the values N, S and ft_x transmitted from the RRC layer of the Node B.

An UpPTS generator 731 creates UpPTS and provides the created UpPTS to the switch 720. The UpPTS is transmitted when the UE is required to be assigned a channel from the Node B, or in a handover (or handoff) condition, and is used by the Node B in controlling uplink transmission power of the UE or uplink transmission synchronization. The DwPTS is received by the UE to initially search the Node B, and serves to indicate the position of a primary common control physical channel (P-CCPCH) transmitting the BCH containing the system information and the position of the currently received downlink frame in the multi-frame configuration. In addition, in the NB-TDD CDMA mobile communication system, the Node B transmits and receives data by scheduling a predetermined number of 10 ms radio frames. In this case, 64 radio frames or 72 radio frames constitute one multi-frame. Therefore, the uplink channel output from the switch 720 is transmitted to the Node B through an antenna 723 after being converted to a carrier frequency band by an RF (Radio Frequency) processor 722.

Heretofore, the structure of the UE transmitter has been described. Next, a structure of the UE receiver for receiving a downlink channel from the Node B will be described with reference to FIG. 7.

A downlink channel signal received through the antenna 723 is provided to the RF processor 722. The RF processor 722 down-converts the output signal of the antenna 723 to a baseband frequency, and provides its output to the switch 720. The switch 720, under the control of the controller 721, is switched on at a reception point of the downlink channel signal, to provide the output signal of the RF processor 722 to a demodulator 732. The downlink channel signal received at the $i^{th}$ UE from the Node B may include DwPTS, and the switch 720 provides the output signal of the RF processor 722 to a DwPTS analyzer 731 at a reception point of the DwPTS. The DwPTS analyzer 731 detects a position of the BCH and a position of the currently received downlink frame in the multi-frame configuration by analyzing the received DwPTS. The demodulator 732 demodulates the modulated user data part in a demodulation mode corresponding to the modulation mode of the QPSK, 8PSK or QAM modulation used by the Node B, and provides the demodulated signal to a demultiplexer 733. The demultiplexer 733 demultiplexes the output signal of the demodulator 732 into a midamble 734 and a user data part, and provides the user data part to a multiplier 735. The midamble 734 is used to measure a reception power level of the downlink channel transmitted from the Node B, and indicates the type of the downlink channel transmitted from the Node B. Thus, it is possible to determine whether there is data transmitted to the UE, by simply analyzing the midamble 734.

The multiplier 735 descrambles the user data part output from the demultiplexer 733 by multiplying it by a scrambling code $C_{SCRAMBLE}$ identical to the scrambling code used by the Node B, and provides the descrambled user data part to a despreader 736. The despreader 736 separates user data, system information of the Node B, or control information for the UE from the descrambled user data part output from the multiplier 735, despreads the spread user data and the downlink common channel, and then provides the despread signal to a demultiplexer 38. The despreader 736 separates the user data part, i.e., the user data and the downlink common channel, by multiplying the output signal of the multiplier 735 by the same OVSF code $C_{OVSF}$ as the OVSF code used in the Node B.

The $i^{th}$ user's data output from the despreader 736 is provided to the demultiplexer 738, and the demultiplexer 738 demultiplexes the $i^{th}$ user's data output from the despreader 736 into TPC 739, TFCI 740, SS 770 and pure user data. The TPC 739 is used in controlling transmission power of the uplink channel to be transmitted by the $i^{th}$ UE, and the TFCI 740 is used in analyzing a transmit format combination indicator of data transmitted from the Node B to the $i^{th}$ UE. Further, the SS 770 is used as a command generated by the Node B to request synchronization control of the uplink channel transmitted by the UE. The $i^{th}$ pure user data output from the demultiplexer 738 is provided to a deinterleaver 741. The deinterleaver 741 deinterleaves the user data output from the demultiplexer 738 and provides the deinterleaved user data to a decoder 742. The decoder 742 channel-decodes the output signal of the deinterleaver 741, thereby detecting $i^{th}$ user's data 743 originally transmitted from the Node B.

The controller 721, which controls the switch 720, randomly sets the transmission point of the uplink channel according to the first to fourth embodiment of the present invention, and thus minimizes the electromagnetic interference felt by the user while performing a call through the $i^{th}$ UE. That is, the electromagnetic interference of the audible frequency band is removed by randomly controlling the transmission point of the uplink and downlink user data from/to the UE. The controller 721 determines whether the Node B in communication with the $i^{th}$ UE performs an operation of reducing the electromagnetic interference, by analyzing the EMI indicator transmitted over the BCH, and then determines whether to perform its uplink transmission. During a handover, the UE does not read the BCH from a target Node B to which the UE is handed over, so that the UTRAN can indicate whether the target Node B performs the electromagnetic interference reducing operation, using a handover message or an active set update message. Here, the term "UTRAN" refers to all the elements of the $3^{rd}$ generation asynchronous mobile communication system, excepting the UEs. In the embodiment of the present invention, the controller minimizes the electromagnetic interference by randomly setting the uplink time slot point both in the Node B and the UE in the same manner. Thus, the Node B can exactly determine the reception point of the uplink channel transmitted from the UE.

Now, a description will be made of a transceiver structure of the Node B with reference to FIG. 8.

First, a transmitter structure of the Node B transceiver shown in FIG. 8 will be described.

$i^{th}$ user's downlink data 801 to be transmitted to the $i^{th}$ UE is provided to an encoder 802. The encoder 802 channel-codes the received downlink user data 801 and provides the channel-coded signal to an interleaver 803. The interleaver 803 interleaves the output signal of the encoder 802 according to a predetermined rule, and provides the interleaved signal to a multiplexer (MUX) 806. The multiplexer 806 creates an $i^{th}$ user's data part by multiplexing the downlink user data for the $i^{th}$ UE, output from the interleaver 803, the TPC 805 for controlling uplink transmission power of the $i^{th}$ UE, the TFCI 804 indicating a transport format used for the $i^{th}$ user's data, and the SS 860 requesting synchronization control of the uplink transmission channel from the UE, and provides its output to a spreader 807. The spreader 807 channel-spreads the $i^{th}$ user's data part output from the multiplexer 806 with a channelization code, e.g., an OVSF code $C_{OVSF}$, used for the downlink channel from the $i^{th}$ UE, and provides the spread signal to a multiplier 808. The multiplier 808 multiplies the output signal of the spreader 807 by a channel gain parameter set for transmission power of the downlink channel to be transmitted to the $i^{th}$ UE, and provides its output to a summer 811. The summer 811 sums the output signal (i.e., the $i^{th}$ user's downlink channel) of the multiplier 808, a downlink common channel 810 and another user's downlink channel 809, and provides its output to a multiplier 812. The channels summed by the summer 811 are channel-spread with different OVSF codes, so that the channels, even though they are summed, do not affect each other. The multiplier 812 scrambles the output signal of the summer 811 with the scrambling code $C_{SCRAMBLE}$ identical to that used in the Node B, and provides its output to a multiplexer 814. The multiplexer 814 creates a downlink channel time slot by multiplexing the downlink channel signals output from the multiplier 812 and a received midamble 813, and provides its output to a modulator 815. The midamble 813 can be used when the UE having received the midamble 813 estimates a transmission power level of the Node B, and also used to indicate the channels transmitted over the downlink channel time slot multiplexed by the multiplexer 814.

The modulator 815 modulates the downlink channel signals output from the multiplexer 814 and provides the modulated signals to a switch 820. The modulation mode performed by the modulator 815 includes BPSK (Binary Phase Shift Keying), QPSK, 8PSK and QAM. The switch 820, under the control of a controller 821, is connected to the modulator 815 at a transmission point of the downlink channel time slot, to transmit the downlink channel time slot to an RF processor 822. That is, the switch 820 is switched on to the modulator 815 only at the transmission point of the downlink channel time slot, under the control of the controller 821, thereby to transmit the downlink channel time slot to the RF processor 822. In addition, the switch 820, under the control of the controller 821, is switched to a DwPTS generator 816 and transmits DwPTS created by the DwPTS generator 816 at a transmission point of the DwPTS. Here, the DwPTS is used in estimating a position of the BCH including Node B information, a level of the signal from the Node B, and a position of a currently received frame in the multi-frame in an initial Node B search process by the UE having received the DwPTS. The RF processor 822 converts the downlink channel time slot to a carrier band, and transmits its output to an antenna 823. The antenna 823 transmits the downlink channel time slot in the carrier band, output from the RF processor 822, to the corresponding UEs.

Next, a receiver structure of the Node B transceiver shown in FIG. 8 will be described.

Uplink channel signals received from the UEs through the antenna 823 are provided to the RF processor 822. The RF processor 822 converts the carrier band signal output from the antenna 823 to a baseband frequency signal, and provides the baseband frequency signal to the switch 820. The switch 820, under the control of the controller 821, is switched on to a demodulator 831 at a predetermined reception point to receive the uplink signals transmitted from the UE. The controller 821 operates in the same way as the controller 721 of the UE shown in FIG. 7. That is, the controller 821 selects one of the first to fourths embodiments, determines uplink channel signal transmission points by the UEs in the Node B according to the selected embodiment, i.e., the uplink channel sub-frame time slots transmitted by the UEs, and then controls the switch 820 according to the determined results. The controller 821 can exactly determine the reception point of the uplink signals from the UEs in the Node B by selecting one of the embodiments of the present invention depending on an electromagnetic interference reduction indicator transmitted from the UTRAN to the Node B. In addition, the controller 821 switches the switch 820 to an UpPTS analyzer 830 at a reception point of the UpPTS, to allow the UpPTS analyzer 830 to analyze the UpPTSs transmitted from the UEs.

The demodulator 831 demodulates the received uplink user data part and provides the demodulated signal to a demultiplexer 832. The demultiplexer 832 demultiplexes the output signal of the demodulator 831 into a midamble 833 and a pure uplink user data part, and provides the separated uplink user data part to a multiplier 834. The midamble 833 is used in estimating a channel environment between the UE and the Node B, and a power level of the signal transmitted from the UE. The multiplier 834 descrambles the output signal of the demultiplexer 832 by multiplying it by the same scrambling code $C_{SCRAMBLE}$ as the scrambling code used by the UE transceiver of FIG. 7, and provides its output to a despreader 835. The despreader 835 despreads the output signal of the multiplier 834 into uplink user data parts of the respective UEs, and provides an $i^{th}$ user's uplink signal data part among the separated uplink user data parts to a demultiplexer 836. The demultiplexer 836 demultiplexes the uplink user data part from the $i^{th}$ UE into TPC 837, TFCI 838, SS 870 and $i^{th}$ user's data, and provides the $i^{th}$ user's data to a deinterleaver 839. The TPC 837 is used in controlling a power level of a downlink transmission signal to the $i^{th}$ UE, and the TFCI 838 is used in analyzing a transport format used for the user data part from the $i^{th}$ UE. Further, the SS 870 is used in controlling a transmission point of the downlink channel to the UE. The deinterleaver 839 deinterleaves the $i^{th}$ user's data output from the demultiplexer 836, and provides the deinterleaved user data to a decoder 840. The decoder 840 decodes the $i^{th}$ user's data output from the deinterleaver 839, thereby detecting the $i^{th}$ user's uplink data 841 transmitted from the $i^{th}$ UE. Another user's uplink data 850 output from the despreader 835 is also detected by the Node B through the same process as the $i^{th}$ user's data.

The NB-TDD CDMA mobile communication system according to the present invention randomly sets the sub-frame time slots for transmitting user data of the UE and the Node B, thereby removing the electromagnetic interference noise, an intermittence noise of the audible frequency band due to periodic signal transmission, which may occur when a sub-frame time slot initially assigned during call setup is maintained until the call is ended. Therefore, the NB-TDD CDMA mobile communication system has improved QoS (Quality of Service).

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for randomly assigning downlink sub-frame time slots transmitting user data in an TDD (Time Division Duplexing) communication system which includes a plurality of frames having different frame numbers, each of the frames including a plurality of sub-frames having different sub-frame numbers, each of the sub-frames including a plurality of time slots, said apparatus assigns user data of a plurality of user equipments (UEs) to the time slots in each sub-frame, the apparatus comprising:

a multiplexer for creating a user data part by multiplexing user data for a UE, a TFCI (Transport Format Combination Indicator) symbol for the user data, and a TPC (Transmission Power Control command) symbol for controlling transmission power of a downlink channel; and a controller for randomly assigning time slots for transmitting the user data part in the sub-frames, based on a time slot number initially assigned for the user data part, a sub-frame number at a transmission point of the user data part, and the number of assigned uplink time slots in the corresponding sub-frame.

2. The apparatus as claimed in claim 1, wherein the controller assigns, as a time slot number for transmitting the user data part, a fourth value determined by adding the number of downlink time slots in the sub-frame to a third value obtained by performing a modulo operation with the number of the uplink time slots on a second value determined by adding the initially assigned time slot number to a first value generated from a function having an input value determined by exclusive ORing (XOR) a binary sequence corresponding to the sub-frame number and an arbitrary binary sequence among binary sequences having the same length as the binary sequence corresponding to the sub-frame number.

3. The apparatus as claimed in claim 2, wherein the function is represented by, $$M[A] = \sum_{n=0}^{12} a_n$$

where A is a value obtained by XORing the binary sequence corresponding to the sub-frame number and an arbitrary binary sequence among binary sequences having the same length as the binary sequence corresponding to the sub-frame number.

4. The apparatus as claimed in claim 2, wherein the function is represented by, $$M[A] = \sum_{n=0}^{12} a_n \times 2^n$$

where A is a value obtained by XORing the binary sequence corresponding to the sub-frame number and an arbitrary binary sequence among binary sequences having the same length as the binary sequence corresponding to the sub-frame number.

5. The apparatus as claimed in claim 2, wherein the function is represented by, $$M[A] = \sum_{n=0}^{12} a_n \times (n+1)$$

where A is a value obtained by XORing the binary sequence corresponding to the sub-frame number and an arbitrary binary sequence among binary sequences having the same length as the binary sequence corresponding to the sub-frame number.

6. An apparatus for randomly assigning uplink sub-frame time slots transmitting user data in an TDD (Time Division Duplexing) communication system which includes a plurality of frames having different frame numbers, each of the frames including a plurality of sub-frames having different sub-frame numbers, each of the sub-frames including a plurality of time slots, said apparatus assigns user data of a plurality of UEs (User Equipments) to the time slots in each sub-frame, the apparatus comprising:

a multiplexer for creating a user data part by multiplexing user data to be transmitted to a Node B, a TFCI (Transport Format Combination Indicator) symbol for the user data, and a TPC (Transmission Power Control command) symbol for controlling transmission power of an uplink channel; and a controller for randomly assigning time slots for transmitting the user data part in the sub-frames, based on a time slot number initially assigned for the user data part, a sub-frame number at a transmission point of the user data part, and the number of assigned uplink time slots in the corresponding sub-frame.

7. The apparatus as claimed in claim 6, wherein the controller assigns, as a time slot number for transmitting the user data part, a fourth value determined by adding the number of downlink time slots in the sub-frame to a third value obtained by performing a modulo operation with the number of the uplink time slots on a second value determined by adding the initially assigned time slot number to a first value generated from a function having an input value determined by exclusive ORing (XORing) a binary sequence corresponding to the sub-frame number and an arbitrary binary sequence among binary sequences having the same length as the binary sequence corresponding to the sub-frame number.

8. The apparatus as claimed in claim 7, wherein the function is represented by, $$M[A] = \sum_{n=0}^{12} a_n$$

where A is a value obtained by XORing the binary sequence corresponding to the sub-frame number and an arbitrary binary sequence among binary sequences having the same length as the binary sequence corresponding to the sub-frame number.

9. The apparatus as claimed in claim 7, wherein the function is represented by, $$M[A] = \sum_{n=0}^{12} a_n \times 2^n$$

where A is a value obtained by XORing the binary sequence corresponding to the sub-frame number and an arbitrary binary sequence among binary sequences having the same length as the binary sequence corresponding to the sub-frame number.

10. The apparatus as claimed in claim 7, wherein the function is represented by, $$M[A] = \sum_{n=0}^{12} a_n \times (n+1)$$

where A is a value obtained by XORing the binary sequence corresponding to the sub-frame number and an arbitrary binary sequence among binary sequences having the same length as the binary sequence corresponding to the sub-frame number.

11. An apparatus for receiving a downlink signal of randomly assigned sub-frame time slots transmitting user data in an TDD (Time Division Duplexing) communication system which includes a plurality of frames having different frame numbers, each of the frames including a plurality of sub-frames having different sub-frame numbers, each of the sub-frames including a plurality of time slots, and assigns user data of a plurality of UEs (User Equipments) to the time slots in each sub-frame, the apparatus comprising:

a controller for determining reception sub-frame time slots in association with the randomly assigned sub-frame time slots, based on a time slot number initially assigned at a reception point of the downlink signal and a sub-frame number at the reception point; and a demultiplexer for demultiplexing the downlink signal received at the reception sub-frame time slots, and outputting user data, a TFCI (Transport Format Combination Indicator) symbol for the user data, and a TPC (Transmission Power Control command) symbol for controlling transmission power of a downlink channel.

12. An apparatus for receiving uplink signals of randomly assigned sub-frame time slots transmitting user data in an TDD (Time Division Duplexing) communication system which includes a plurality of frames having different frame numbers, each of the frames including a plurality of sub-frames having different sub-frame numbers, each of the sub-frames including a plurality of time slots, and assigns user data of a plurality of UEs (User Equipments) to the time slots in each sub-frame, the apparatus comprising:

a controller for determining reception sub-frame time slots in association with the randomly assigned sub-frame time slots, based on a time slot number initially assigned at a reception point of the uplink signals and a sub-frame number at the reception point; and a demultiplexer for demultiplexing the uplink signals received at the reception sub-frame time slots, and outputting user data, a TFCI (Transport Format Combination Indicator) symbol for the user data, and a TPC (Transmission Power Control command) symbol for controlling transmission power of an up link channel.

13. A method for randomly assigning downlink sub-frame time slots transmitting user data in an TDD (Time Division Duplexing) communication system which includes a plurality of frames having different frame numbers, each of the frames including a plurality of sub-frames having different sub-frame numbers, each of the sub-frames including a plurality of time slots, and assigns user data of a plurality of UEs (User Equipments) to the time slots in each sub-frame, the method comprising the steps of:

creating a user data part by multiplexing user data for a UE, a TFCI (Transport Format Combination Indicator) symbol for the user data, and a TPC (Transmission Power Control command) symbol for controlling transmission power of a downlink channel; and randomly assigning time slots for transmitting the user data part in the sub-frames, based on a time slot number initially assigned for the user data part, a sub-frame number at a transmission point of the user data part, and the number of assigned uplink time slots in the corresponding sub-frame.

14. The method as claimed in claim 13, wherein the step of randomly assigning the time slots comprises the step of assigning, as a time slot number for transmitting the user data part, a fourth value determined by adding the number of downlink time slots in the sub-frame to a third value obtained by performing a modulo operation with the number of the uplink time slots on a second value determined by adding the initially assigned time slot number to a first value generated from a function having an input value determined by exclusive ORing (XORing) a binary sequence corresponding to the sub-frame number and an arbitrary binary sequence among binary sequences having the same length as the binary sequence corresponding to the sub-frame number.

15. The method as claimed in claim 14, wherein the function is represented by, $$M[A] = \sum_{n=0}^{12} a_n$$

where A is a value obtained by XORing the binary sequence corresponding to the sub-frame number and an arbitrary binary sequence among binary sequences having the same length as the binary sequence corresponding to the sub-frame number.

16. The method as claimed in claim 14, wherein the function is represented by, $$M[A] = \sum_{n=0}^{12} a_n \times 2^n$$

where A is a value obtained by XORing the binary sequence corresponding to the sub-frame number and an arbitrary binary sequence among binary sequences having the same length as the binary sequence corresponding to the sub-frame number.

17. The method as claimed in claim 14, wherein the function is represented by, $$M[A] = \sum_{n=0}^{12} a_n \times (n+1)$$

where A is a value obtained by XORing the binary sequence corresponding to the sub-frame number and an arbitrary binary sequence among binary sequences having the same length as the binary sequence corresponding to the sub-frame number.

18. A method for randomly assigning uplink sub-frame time slots transmitting user data in an TDD (Time Division Duplexing) communication system which includes a plurality of frames having different frame numbers, each of the frames including a plurality of sub-frames having different sub-frame numbers, each of the sub-frames including a plurality of time slots, and assigns user data of a plurality of IJEs (User Equipments) to the time slots in each sub-frame, the method comprising the steps of:

creating a user data part by multiplexing user data to be transmitted to a Node B, a TFCI (Transport Format Combination Indicator) symbol for the user data, and a TPC (Transmission Power Control command) symbol for controlling transmission power of an uplink channel; and randomly assigning time slots for transmitting the user data part in the sub-frames, based on a time slot number initially assigned for the user data part, a sub-frame number at a transmission point of the user data part, and the number of assigned uplink time slots in the corresponding sub-frame.

19. The method as claimed in claim 18, wherein the step of randomly assigning the time slots comprises the step of assigning, as a time slot number for transmitting the user data part, a fourth value determined by adding the number of downlink time slots in the sub-frame to a third value obtained by performing a modulo operation with the number of the uplink time slots on a second value determined by adding the initially assigned time slot number to a first value generated from a function having an input value determined by exclusive ORing (XORing) a binary sequence corresponding to the sub-frame number and an arbitrary binary sequence among binary sequences having the same length as the binary sequence corresponding to the sub-frame number.

20. The method as claimed in claim 19, wherein the function is represented by, $$M[A] = \sum_{n=0}^{12} a_n$$

where A is a value obtained by XORing the binary sequence corresponding to the sub-frame number and an arbitrary binary sequence among binary sequences having the same length as the binary sequence corresponding to the sub-frame number.

21. The method as claimed in claim 19, wherein the function is represented by, $$M[A] = \sum_{n=0}^{12} a_n \times 2^n$$

where A is a value obtained by XORing the binary sequence corresponding to the sub-frame number and an arbitrary binary sequence among binary sequences having the same length as the binary sequence corresponding to the sub-frame number.

22. The method as claimed in claim 19, wherein the function is represented by, $$M[A] = \sum_{n=0}^{12} a_n \times (n+1)$$

where A is a value obtained by XORing the binary sequence corresponding to the sub-frame number and an arbitrary binary sequence among binary sequences having the same length as the binary sequence corresponding to the sub-frame number.

23. A method for receiving a downlink signal of randomly assigned sub-frame time slots transmitting user data in an TDD (Time Division Duplexing) communication system which includes a plurality of frames having different frame numbers, each of the frames including a plurality of sub-frames having different sub-frame numbers, each of the sub-frames including a plurality of time slots, and assigns user data of a plurality of UEs (User Equipments) to the time slots in each sub-frame, the method comprising the steps of:

determining reception sub-frame time slots in association with the randomly assigned sub-frame time slots, based on a time slot number initially assigned at a reception point of the downlink signal and a sub-frame number at the reception point; and demultiplexing the downlink signal received at the reception sub-frame time slots, and outputting user data, a TFCI (Transport Format Combination Indicator) symbol for the user data, and a TPC (Transmission Power Control) symbol for controlling transmission power of a downlink channel.

24. A method for receiving uplink signals of randomly assigned sub-frame time slots transmitting user data in an TDD (Time Division Duplexing) communication system which includes a plurality of frames having different frame numbers, each of the frames including a plurality of sub-frames having different sub-frame numbers, each of the sub-frames including a plurality of time slots, and assigns user data of a plurality of UEs (User Equipments) to the time slots in each sub-frame, the method comprising the steps of:

determining reception sub-frame time slots in association with the randomly assigned sub-frame time slots, based on a time slot number initially assigned at a reception point of the uplink signals and a sub-frame number at the reception point; and demultiplexing the uplink signals received at the reception sub-frame time slots, and outputting user data, a TFCI (Transport Format Combination Indicator) symbol for the user data, and a TPC (Transmission Power Control command) symbol for controlling transmission power of an uplink channel.

* * * * *